(12) United States Patent
Jin et al.

(10) Patent No.: US 6,711,317 B2
(45) Date of Patent: Mar. 23, 2004

(54) RESILIENTLY PACKAGED MEMS DEVICE AND METHOD FOR MAKING SAME

(75) Inventors: Sungho Jin, Millington, NJ (US); Hareesh Mavoori, Piscataway, NJ (US); Hyongsok Soh, Basking Ridge, NJ (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 0 days.

(21) Appl. No.: 09/769,193

(22) Filed: Jan. 25, 2001

(65) Prior Publication Data

US 2002/0097952 A1 Jul. 25, 2002

(51) Int. Cl.[7] .................................................. G02B 6/35
(52) U.S. Cl. ........................ 385/18; 385/17; 359/618; 359/838
(58) Field of Search ................... 385/17, 18; 359/872, 359/876, 618, 838

(56) References Cited

U.S. PATENT DOCUMENTS

| 5,430,421 | A | * | 7/1995 | Bornand et al. | ............. 335/154 |
| 5,771,321 | A | * | 6/1998 | Stern | ............................ 385/31 |
| 6,055,344 | A | * | 4/2000 | Fouquet et al. | ................ 385/16 |
| 6,201,629 | B1 | * | 3/2001 | McClelland et al. | ........ 359/223 |
| 6,229,640 | B1 | * | 5/2001 | Zhang | ......................... 359/290 |
| 6,275,326 | B1 | * | 8/2001 | Bhalla et al. | ............... 359/298 |
| 6,297,072 | B1 | * | 10/2001 | Tilmans et al. | ............. 438/106 |
| 6,351,577 | B1 | * | 2/2002 | Aksyuk et al. | ............... 385/15 |
| 6,356,689 | B1 | * | 3/2002 | Greywall | ..................... 385/52 |
| 6,360,036 | B1 | * | 3/2002 | Couillard | ..................... 385/19 |

* cited by examiner

*Primary Examiner*—John D. Lee
*Assistant Examiner*—Jennifer Doan

(57) ABSTRACT

In accordance with the invention, a MEMs device comprises a component layer, an actuator layer and an intervening spacer. The component layer, the spacer and the actuator layer are assembled at ambient temperature and held together in lateral alignment by resilient spring members. The spacer provides the walls of a cavity between a component and an actuator to permit movement of the component. The walls are advantageously conductive and cover the bulk of the peripheral boundary of the cavity to provide electrostatic isolation and aerodynamic isolation.

37 Claims, 11 Drawing Sheets

US 6,711,317 B2

RESILIENTLY PACKAGED MEMS DEVICE AND METHOD FOR MAKING SAME

FIELD OF THE INVENTION

The present invention relates to micro-electro-mechanical devices ("MEMs devices") and, in particular, to improved MEMs devices held together by resilient packaging. The inventive MEMs devices are particularly useful as movable mirror devices for beam steering in optical communication systems.

BACKGROUND OF THE INVENTION

MEMs devices are of considerable importance in optical communication systems. In one important application, a MEMs device provides a two-dimensional array of movable components, such as mirrors, sensors, or even mechanical paddles. Each movable component in the array can be electrically moved.

A typical MEMs mirror device comprises an array of metal-coated silicon mirrors, each mirror movably coupled to a surrounding silicon frame via a gimbal. Two torsional members on opposite sides of the mirror connect the mirror to the gimbal and define the mirror's axis of rotation. The gimbal, in turn, is coupled to the surrounding silicon frame via two torsional members defining a second axis of rotation orthogonal to that of the mirror. A light beam can therefore be steered in any direction.

Electrodes are disposed in a cavity underlying the mirror and the gimbal. Voltages applied between the mirror and an underlying electrode and between the gimbal and an electrode control the orientation of the mirror. Alternatively, in slightly modified arrangements, an electrical signal can control the position of the mirror magnetically or piezoelectrically.

FIGS. 1(a) and 1(b) illustrate conventional optical MEMs devices and their application. FIG. 1(a) shows a typical prior art optical MEMs mirror structure. The device comprises a mirror 1 coupled to a gimbal 2 on a polysilicon frame 3. The components are fabricated on a substrate 4 by micromachining processes such as multilayer deposition and selective etching. After etching, mirror assembly (1,2,3) is raised above the substrate 4 by upward bending lift arms 5 during a release process. The mirror 1 in this example is double-gimbal cantilevered and attached onto the frame structure 3 by springs 6. The mirror 1 can be tilted to any desired orientation for optical signal routing via electrostatic or other actuation with electrical voltage or current supplied as to electrodes 7 from outside. The light-reflecting surface of mirror 1 comprises a metal-coated polysilicon membrane, which is typically of circular shape. The metal layers 8 are deposited by known thin film deposition methods such as evaporation, sputtering, electrochemical deposition, or chemical vapor deposition.

FIG. 1(b) schematically illustrates an important application of optical MEMs mirrors as controllable mirror arrays for optical signal routing. The cross connect system shown here comprises optical input fibers 10, optical output fibers 11 and an array of MEMs mirrors 1 on a substrate 4. The optical signals from the input fibers 10 are incident on aligned mirrors 1. The mirrors 1, with the aid of an auxiliary mirror 12 and appropriate imaging lenses 13, are electrically controlled to reflect the incident optical signals to respective output fibers 11. In alternative schemes, the input fibers and the output fibers are in separate arrays, and a pair of MEMs mirror arrays are used to perform the cross connect function.

The tilting of each mirror is controlled by applying specific electric fields to one or more of the electrodes (not shown) beneath the mirror. Undesirable variations in the gap spacing between the mirror layer and the electrode layer alter the electric field, which affects the degree of mirror tilting. This in turn alters the path or coherency of light signals reaching the receiving fibers, thus increasing the signal loss during beam steering.

A MEMs device is essentially composed of two layers: a component layer comprising the array of microscale components, such as microscale mirror elements, movably coupled to a surrounding frame and an actuator layer comprising the microscale actuators, such as electrodes, and the conductive paths needed to move the components. Microscale components typically have a maximum dimension of less than 10,000 micrometers. One approach to fabricating the array is to fabricate the actuator layer and the component layer as successive layers on the same workpiece and then to lift up the component layer above the actuator layer using vertical thermal actuators or stresses in thin films. This lift-up process is described in U.S. patent application Ser. No. 09/415,178 filed by V. A. Aksyuk et al. on Nov. 8, 1999 and assigned to applicant's assignee.

An alternative approach is to fabricate the component layer on one substrate, the actuator layer on a separate substrate and then to assemble the two substrates as mating parts with accurate alignment and spacing. The two-part assembly process is described in U.S. Pat. No. 5,629,790 issued to Neukermans et al. on May 13, 1997 and in U.S. patent application Ser. No. 09/559,216 filed by Greywall on Apr. 26, 2000, both of which are incorporated herein by reference. This two-part assembly provides a more robust structure, greater component packing density and permits larger component sizes and rotation angles as well as scalability to larger arrays.

To retain the accurate lateral alignment of the component layer and the actuator layer once the alignment is achieved, often requires high temperature bonding processes such as soldering at ~100–300° C., epoxy curing at 100–200° C., polyimide curing at ~250–400° C., glass frit bonding (sometimes called glass solder bonding) at 400–700° C., or anodic bonding at 400–900° C. But the exposure of the MEMs components to temperatures even as low as ~150° C. can cause undersirable distortion or curvature. If the components are mirrors, heat can also cause metallurgical reactions at the interfaces between the mirror metallization and the silicon substrate with consequent contamination of the mirror metal, creep and dimensional changes, formation of brittle intermetallic compounds, and long-term reliability problems. The bowing or curving of the mirrors generally results in non-focused or non-parallel light reflection and loss of optical signal. Accordingly, there is a need for an assembly process that can be carried out at ambient temperature without having to expose the MEMs device to high temperature.

SUMMARY OF THE INVENTION

In accordance with the invention, a MEMs device comprises a component layer, an actuator layer and an intervening spacer. The component layer, the spacer and the actuator layer are assembled at ambient temperature and held together in lateral alignment by resilient spring members. The spacer provides the walls of a cavity between a component and an actuator to permit movement of the component. The walls are advantageously conductive and cover the bulk of the peripheral boundary of the cavity to provide electrostatic isolation and aerodynamic isolation.

BRIEF DESCRIPTION OF THE DRAWINGS

The nature, advantages and various additional features of the invention will appear more fully upon consideration of the illustrative embodiments now to be described in detail with the accompanying drawings. In the drawings.

It is to be understood that the drawings are for purposes of illustrating the concepts of the invention and are not to scale.

DETAILED DESCRIPTION OF THE DRAWINGS

Figure 2:
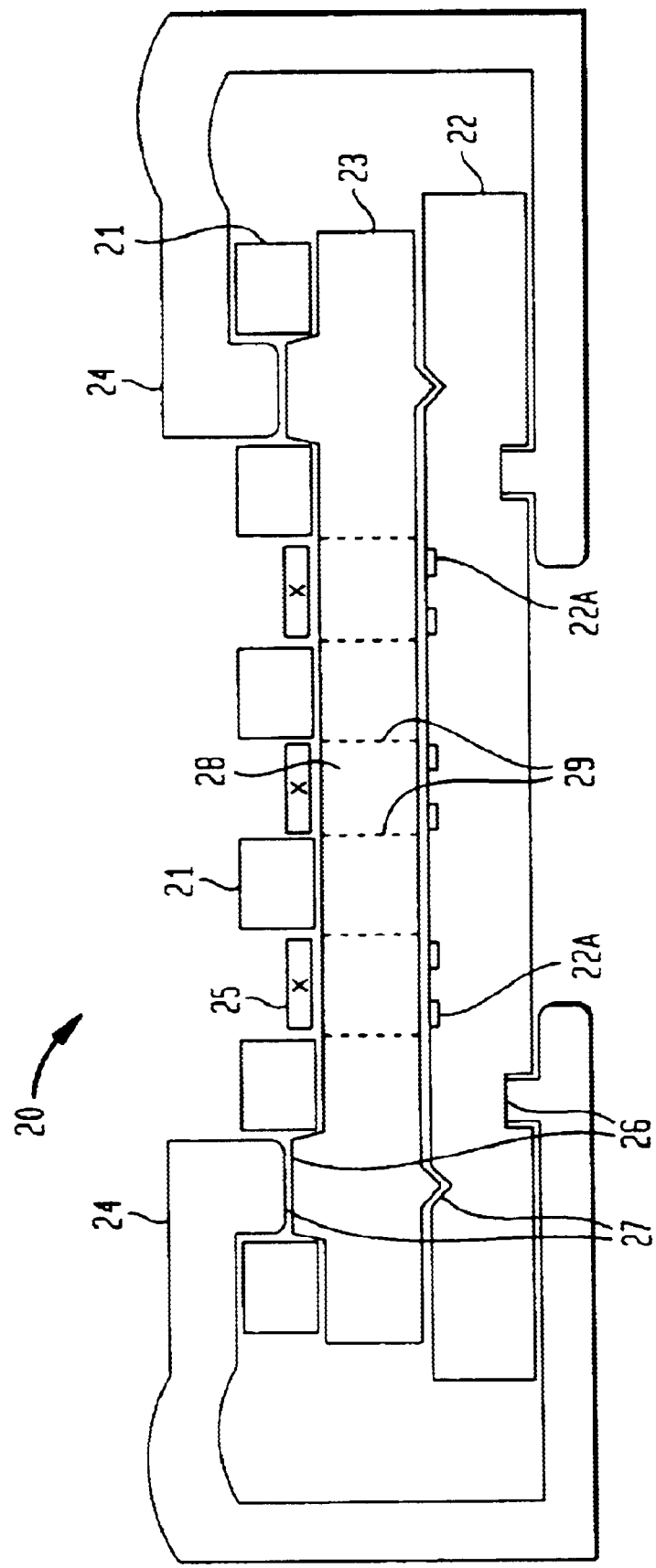
FIG. 2 schematically illustrates of a first embodiment of a spring packaged MEMs device.

Referring to the drawings, FIG. 2 illustrates in schematic cross section a spring packaged MEMs device 20 comprising three basic parts: a component layer 21 (here a mirror layer), an actuator layer 22 (here an electrode layer) and a spacer 23. One or more spring clips 24 apply compressive elastic stress and keep the assembly components locked in place. The component layer, spacer, and actuator layer are laterally aligned, brought vertically close together, and locked in position by the spring clips 24. Component layer 21 includes at least one movable microscale component 25 such as a resiliently mounted microscale mirror. The actuator layer 22 includes microscale actuators, such as electrodes 22A, for moving each component 25. While the components of layer 21 will hereinafter be exemplified as mirrors, it should be understood that the components can be any of a wide variety of microscale components such as gratings, variable thickness slabs, polarizers, chemical sensors, movement sensors or even mechanical paddles. And although actuator layer 22 is exemplified as an array of electrodes, the actuators can be other kinds of microscale actuating devices for moving the components, such as controllable magnets. A typical microscale component has a maximum dimension of less than 10,000 micrometers.

The spacer 23 is disposed medially between the component layer 21 and the actuator layer 22 or is part of one of these layers. The spacer 23 typically includes a cavity 28 defined by walls 29 between each component 21 and its underlying actuators. The walls 29 are preferably conductive to electrostatically shield the component and preferably block a sufficient portion of the boundary around the cavity to provide aerodynamic shielding. The assembled device 20 desirably has accurate lateral (x and y direction) alignments of the component layer and the actuator layer. This can be ensured by protruding and guiding features 26 in the spacer and/or spring that precisely fit into alignment slots 27 in the component and actuator layers 21, 22 The fit provides self-alignment. The accuracy of the alignment is with a deviation from perfect alignment of less than 5% of the mirror diameter (for a mirror size of 1000 $\mu$m, less than 50 $\mu$m deviation), preferably less than 2%, and even more preferably less than 0.5%. If the mirror is not circular but has an oval, square or hexagonal shape, an equivalent diameter giving the same area may be used for the calculation of the alignment accuracy. If the mirror is rectangular, the short dimension of the rectangle may be used in the calculation of alignment accuracy.

It is also desirable to carefully control the vertical gap spacing between the mirror layer 21 and the actuator layer 22, as the spacing determines the intensity of the MEMS actuating electrostatic field for a given applied voltage. The mechanical compressive force exerted by clips 24 ensures that the spacing is essentially the same as the thickness of the spacer. The desired accuracy of the spacing is less than 10% deviation from the spacer thickness, preferably less than 5%, and even more preferably less than 2%.

The clamping compressive force of the springs 24 should be strong enough to keep the assembled layers stably locked in place, yet not overly strong to break the fragile MEMS components. The springs are preferably made of high yield strength materials such as copper or stainless steel spring alloys. A description of such alloys can be found, for example, in *Metals Handbook*, Volume 1, $8^{th}$ Edition, American Society of Metals, Metals Park, Ohio, 1961. The desired strength (for example, in 0.2% offset yield strength) of the spring material is at least 30,000 pounds per square inch (psi) and preferably at least 80,000 psi. While metallic spring materials are preferred the use of ceramic, silicon, or plastic spring materials is not precluded.

Figure 3A:
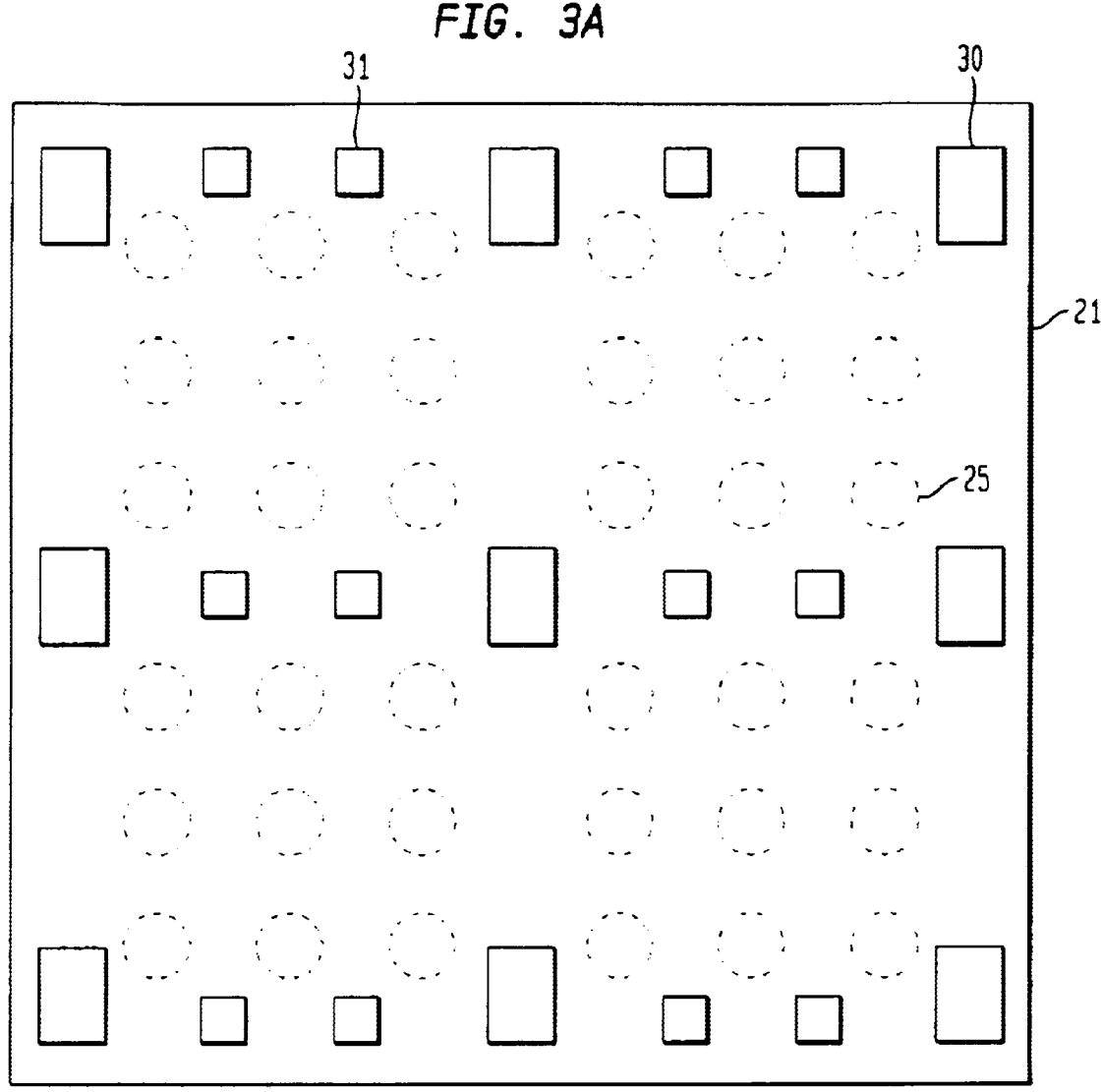
FIGS. 3(a) and 3(b) are top and side views illustrating an exemplary arrangement of springs and aligning features.
Figure 3B:
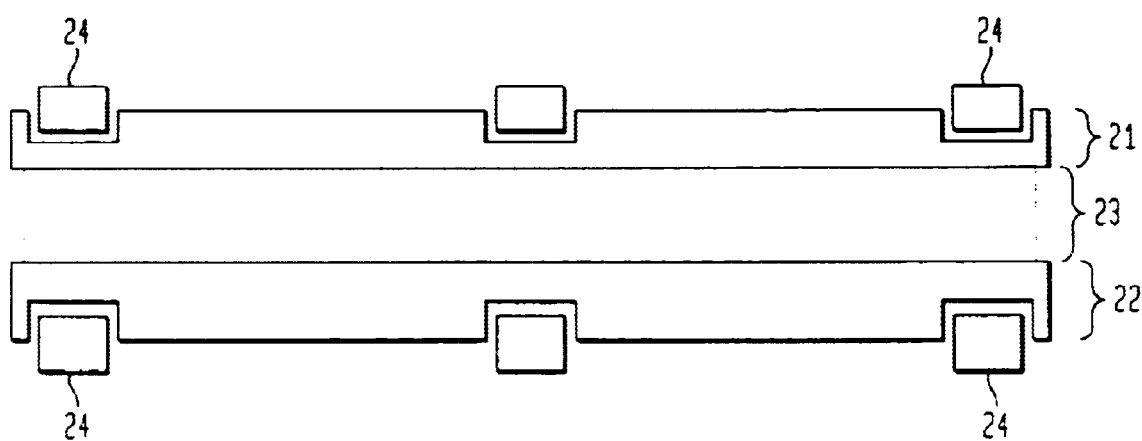

FIGS. 3(a) and 3(b) illustrate one of many possible arrangements of springs and aligning features. FIG. 3(a) is a top view of a mirror layer 21 with an exemplary distribution of alignment slots 30 for compressive spring legs (protruding features). The alignment slots 31 for locking in place the underlying spacer are also indicated. The slots 30 thus provide strips of area ("tracks") set aside for spring placement, so that the springs do not interfere with the operating mirrors.

FIG. 3(b) is a schematic cross-sectional view of the FIG. 3(a) structure indicating the position of the springs 24. The top surface of the component layer 21 may optionally be shaped to have grooved regions so that the bottom portion of the springs can be placed while the flat, spring-free area of the bottom of the actuator layer 22 can be die attached onto a substrate support structure.

The mirror layer 21 can be made from a metal (such as high strength alloy or refractory metal), a ceramic (such as oxide, nitride, carbide, fluoride or diamond) or a semiconductor (such as single crystal silicon, polysilicon, SiC, GaN or GaAs). In a preferred embodiment, the mirror layer comprises an array of 1–10 $\mu$m thick mirror membranes of Si in a somewhat thicker base plate Si substrate (100–500 $\mu$m). It can be made by patterning and etching to form an array of mirrors, gimbals and torsion bars (or springs), using silicon wafer fabrication processing including the well-known SOI (silicon-on-insulator) fabrication method.

The mirrors 25 are electrically grounded and are tilted via electrostatic actuation by one or more of the independently controllable electrodes placed on the actuator layer 22 underneath the mirror. An exemplary desired size of the mirrors suitable for optical MEMS applications is in the range of 50–10000 $\mu$m, and preferably in the range of 200–2000 $\mu$m.

The actuator layer 22 is preferably made using silicon circuit fabrication methods. It contains an array of electrical circuits (not shown) to apply and regulate electric fields to actuate tilting of each mirror to a desired angle and orientation, electrical conductor lines, and interconnection/ packaging contact pads, for bonding. The actuator layer 22 optionally has an additional thin metallization layer (not shown) over its insulating surface (such as $SiO_2$) for the purpose of minimizing electrostatic charge accumulation and to provide some electrostatic shielding between the mirrors.

The spacer 23 may be made of silicon, metal, polymer or ceramic and may be patterned from a sheet material with the desired thickness. The spacer material is patterned into desired size and configuration as by lithographic etching.

An additional benefit of spring packaging is avoidance the severe CTE (coefficient of thermal expansion) mismatch and associated bond failure frequently encountered in solder or epoxy joints with silicon. The CTE mismatch is elastically accommodated rather than causing permanent joint failures by repeated fatigue deformation. In order to further reduce CTE mismatch, the spacer material preferably has a small CTE mismatch as compared to the mirror and actuator layers. For example, if the mirror layer material is silicon, the spacer is desirably a material having a CTE difference from that of Si of less than 6 ppm/° C. and, preferably, less than 3 ppm/° C. Examples of such spacer materials include Si (CTE=~4 ppm/° C.), W (4.6 ppm/° C.), Mo (4.9 ppm/° C.), Zr (5.8 ppm/° C.), Hf(5.9 ppm/° C.), Ta(6.5 ppm/°), Ti(8.4 ppm/° C.) as well as alloys with low CTE values such as Fe—Ni alloys (Invar and Permalloy), Fe—Ni—Co alloys (Kovar), and some ceramic materials.

The use of electrically conducting spacers 23, e.g. spacers made of metals or conductively doped silicon or polysilicon, is advantageous in avoiding electrostatic cross talk between neighboring mirrors, especially in high-density mirror array designs. In such devices the actuating electrostatic field from the electrodes can inadvertently affect the movement of the adjacent mirrors as the electric field applied can easily reach the edges of the neighboring mirrors or gimbals. In a preferred embodiment the spacers 23 are made of highly conductive material so that they block the applied electric field controlling one mirror from reaching the neighboring mirrors or gimbals. The desired electrical resistivity of the spacer material is less than 10 ohm-cm, preferably less than 5000 microohm-cm, and even more preferably less than 100 microohm-cm. It is further desirable to have the spacer essentially completely surrounding the cavity under the mirror so that aerodynamic shielding and electrostatic shielding are achieved simultaneously. The desired coverage of the wall area in the combined aerodynamic/electrostatic shield is at least 20%, preferably at least 50%, even more preferably at least 90% of the total available peripheral boundary area between the adjacent mirror regions.

A further variation uses an electrostatic/aerodynamic isolating spacer 23 of ferromagnetic material, such as magnetically soft material with low coercivity values. Fe—Ni alloys (permalloys) or Fe—Ni—Co alloys (Kovar) are particularly suitable as some of these alloys also exhibit relatively low coefficient of thermal expansion in the range of $2\sim7\times10^{-6}$/° C., comparable to the value for Si ($\sim4\times10^{-6}$/° C.). The ferromagnetic spacer aligned to either the mirror layer or the actuator (electrode) layer can conveniently be held in place by magnetic force exerted by either the permanent magnet or the externally applied magnetic field, so that undesirable position shifts during subsequent assembly steps can be avoided or minimized.

The resilience of spring 24 conveniently accommodates variations in the heights of MEMS components and ensures tight elastic assembly without applying excessive force on the fragile MEMS components. The capable range of the vertical height variation accommodated by the resilience is at least 5 μm and, preferably, at least 20 μm.

If the MEMS device 20 is made to operate in a vacuum environment or at a slow mirror tilting speed, the movement of one mirror may not have much influence on the neighboring mirrors. However, if vacuum environment is not used, then a typical mirror movement (on the order of milliseconds) can cause air turbulence and interfere with the operation and movement of adjacent mirrors. In order to minimize such interference, an aerodynamically isolating spacer can compartmentalize the air volume associated with the space underneath each mirror.

Figure 4A:
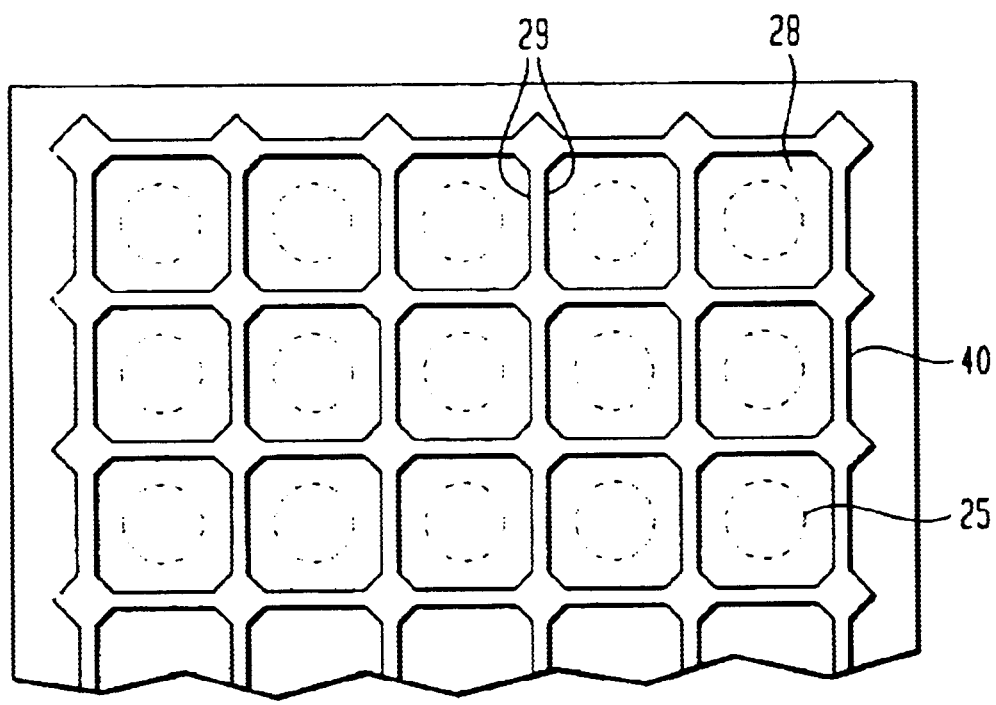
FIGS. 4(a) and 4(b) schematically illustrate exemplary spacers that can be placed between the component layer and the actuator layer.
Figure 4B:
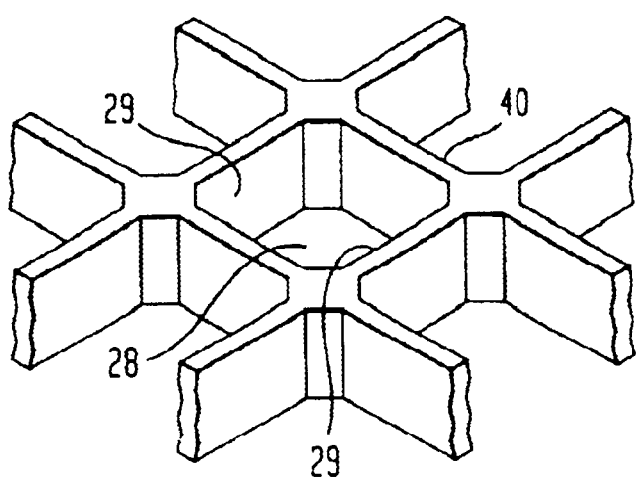

FIG. 4(a) schematically illustrates a top view of an exemplary spacer 40 that provides electrostatic and aerodynamic isolation through the use of conductive walls 29 defining rectangular cavities 28. A perspective view of this structure is given in FIG. 4(b). Other shapes such as circular compartments may also be used. Depending on the device performance requirement, the aerodynamic isolating walls may not have to be 100% isolating, i.e., broken walls are still better than no walls. In addition, the walls 29 need not enclose every mirror. Reduced isolation by the walls for every 4 or 6 mirrors may be acceptable although not preferable. The fraction of the cavity peripheral area blocked by walls 29 is advantageously at least 20%, preferably at least 50%, and even more preferably at least 90%.

In a variation of the invention, the spacer 23 can be pre-attached onto one of the mating parts, e.g., either on the mirror layer 21 or the actuator layer 22. These pre-attached spacers are desirably configured so that the boundary area between adjacent mirrors is at least partially compartmented or blocked for aerodynamically isolating the mirrors. The pre-attached spacer can be made of a metal or an alloy, doped silicon, or conductive coated ceramic, polyimide or plastic material. Plastic materials are less preferred because they tend to outgas in a hermetically sealed atmosphere and also have generally higher CTE values.

Pre-attached metallic spacers such as Cu, Ni, Fe, Co, Au, Pd, Mo, W and their alloys can be electroplated, evaporation deposited, or CVD deposited directly on the mirror layer or the actuator layer and are then patterned into a desired configuration. For electrodeposition, the selective sites on the surface of the substrate have to be made electrically conductive by metallization or electroless coating of conductive seed layers. Silicon, silicon nitride, diamond, or other semiconductor or ceramic materials can also be directly deposited by CVD, RF sputtering or e-beam evaporation. A polysilicon spacer as thick as ~100 μm can be deposited, for example, by chemical vapor deposition process.

Figure 5:
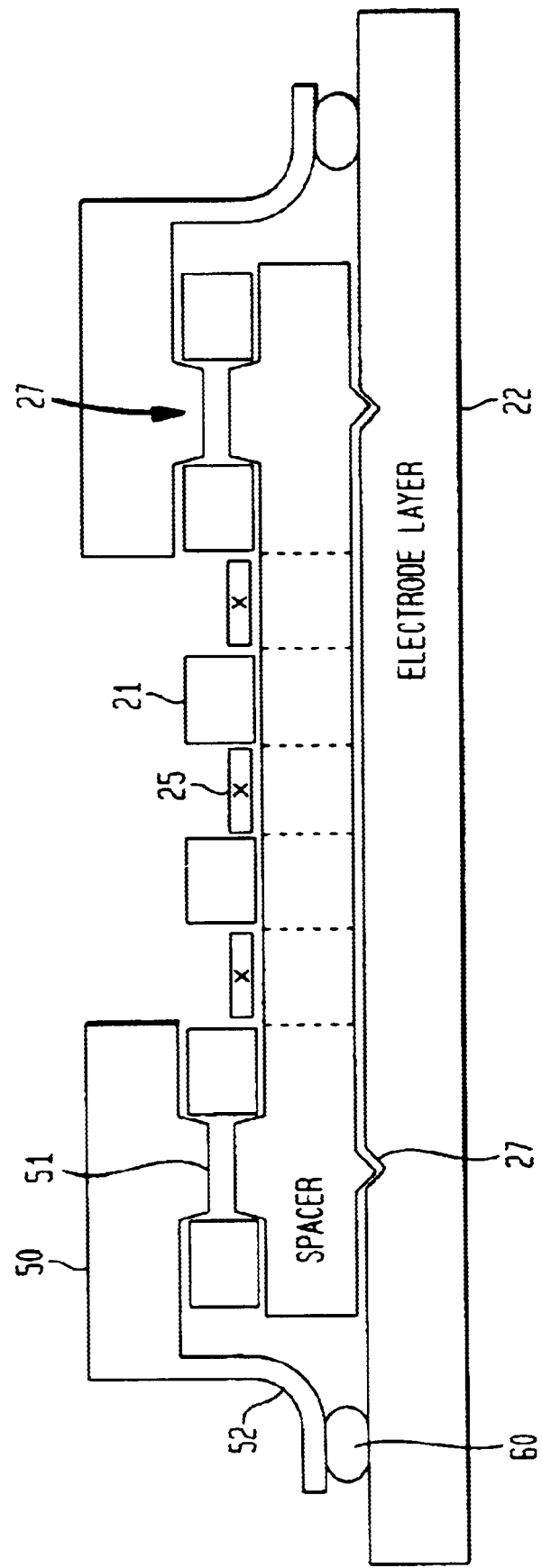
FIG. 5 shows an alternative spring packaged MEMs device including a stiffener frame.

FIG. 5 schematically illustrates an alternative spring packaged MEMs device including a stiffener frame 50 placed over the component layer 21. The stiffener frame 50 is desirably made of easily formable or machinable metal or alloy. It preferably includes alignment features 51 and advantageously has a CTE not significantly different from that of the MEMS base material. The stiffener frame may be made as a single piece or may be composed of two parts, e.g., a thicker and stronger upper portion welded onto a thinner and more resilient sidewall portion 52 bonded onto the surface of the electrode layer (actuator layer) 22 as by soldering, glass frit bonding, anodic bonding, or epoxy bonding. These bonding methods are described, for example, in U.S. Pat. No. 4,477,828, issued to Scherer on Oct. 16, 1984, and U.S. Pat. No. 5,323,051, issued to Adams et al. on Jun. 21, 1994. In order to reduce the exposure of the temperature-sensitive MEMS mirrors and associated metallizations, the bonding process is preferably carried out with local heating near the bond area, as by using laser soldering. In order to enhance solder wetting, the surface of the bonding areas may optionally pre-coated with metallization layers such as Cr/Cu/Au.

The resilience provided by the elastically compliant sidewall 52 conveniently accommodates variations in the heights of MEMS components or the metal frame height and ensures tight elastic assembly without excessive force. The capable range of the vertical height variation accommodated by the resilience is at least 5 $\mu$m and preferably at least 20 $\mu$m.

Figure 6:
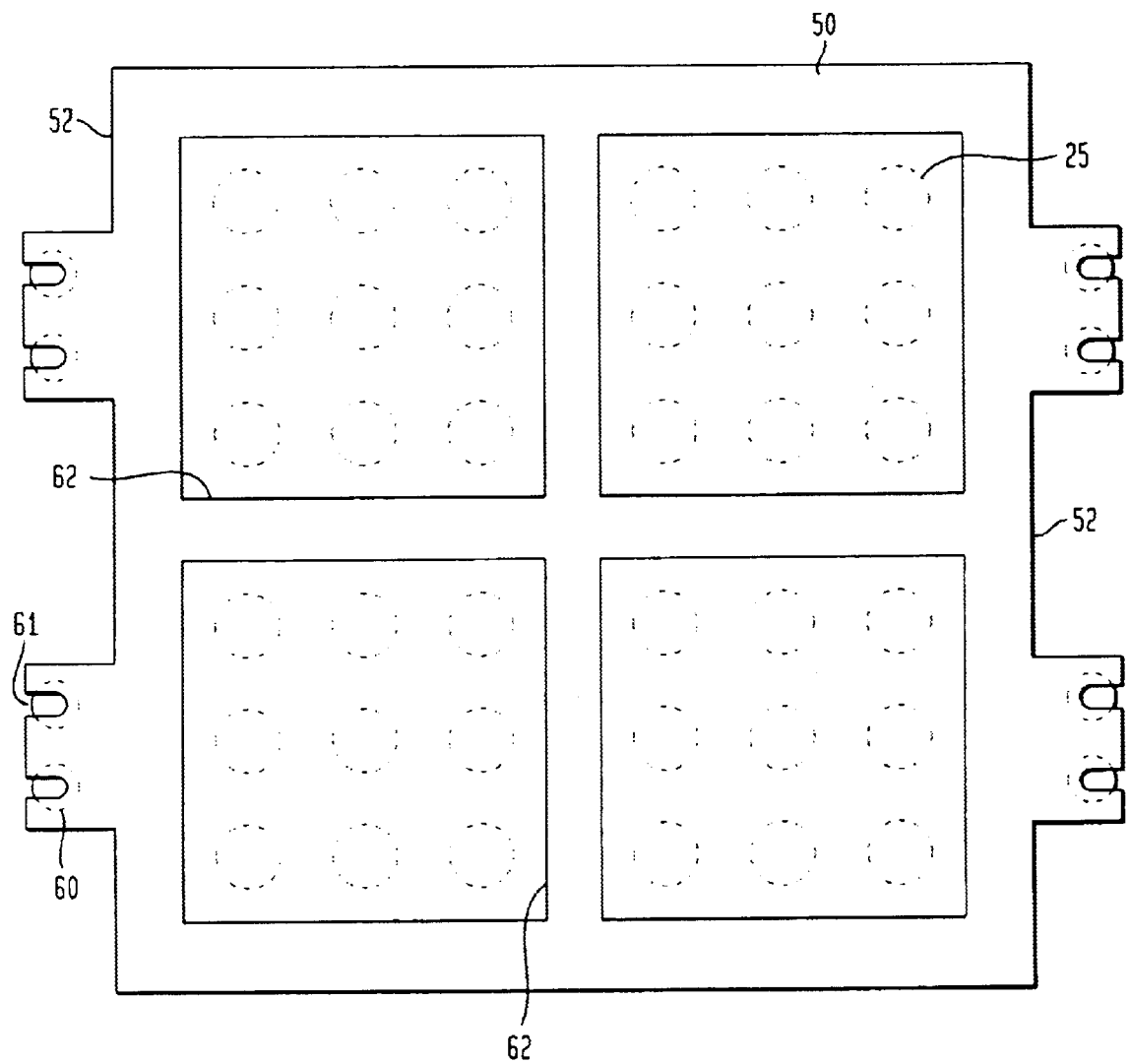
FIG. 6 illustrates an exemplary arrangement for attaching a stiffener frame.

FIG. 6 is a top view of a MEMs device employing a stiffener frame 50 wherein localized areas or spots 60 of the sidewall 52 are bonded onto the electrode layer (actuator layer). The stiffener frame transfers the load uniformly onto the whole MEMS. A stiffener covering only the outside edges of the mirror layer may be sufficient in some applications to provide relatively uniform compression of the mirror layer especially if the mirror-containing substrate is rigid enough (e.g. thicker than 100 $\mu$m). If there is room, however, it is preferred to have the stiffener configured so that some interior portion of the mirror layer is also pressed by the stiffener to further ensure the uniform compression, e.g., as in FIG. 6 wherein the center cross members 62 serve this purpose. The bottom end portion of the sidewall may contain cut-out holes or grooves 61 so that the solder joint is more securely positioned.

Instead of soldering, mechanical riveting may be used. For example, pins of soft metal (such as aluminum, gold, copper, or indium and their alloys) may be pre-attached onto the electrode layer at cut-out hole locations by brazing, soldering, welding or screwing down. The metal frame with sidewalls containing cut-out holes is then aligned and lowered so that the soft metal pins are placed in the holes. A picture-frame shaped pressing die is then lowered onto the pins, to flatten the metal pins, locking them in place around the cutout holes. Depending on the nature of the metal frame material and surface cleanness, the flattened metal may even be cold-weld bonded onto the frame material. This riveting process is advantageously carried out at ambient temperature, although the use of warm pressing, at ~50–90° C., is not excluded.

A portion of the stiffener plate can also be made of optically transparent material such as quartz plate, glass, diamond sheet, sapphire, or LiNbO$_3$ The desired thickness of the stiffener plate is at least 50 $\mu$m, preferably at least 250 $\mu$m. The presence of the stiffener plate makes more uniform the compressive stress applied on to the MEMS assembly, and also protects the fragile MEMS device during handling or subsequent processing.

Figure 7:
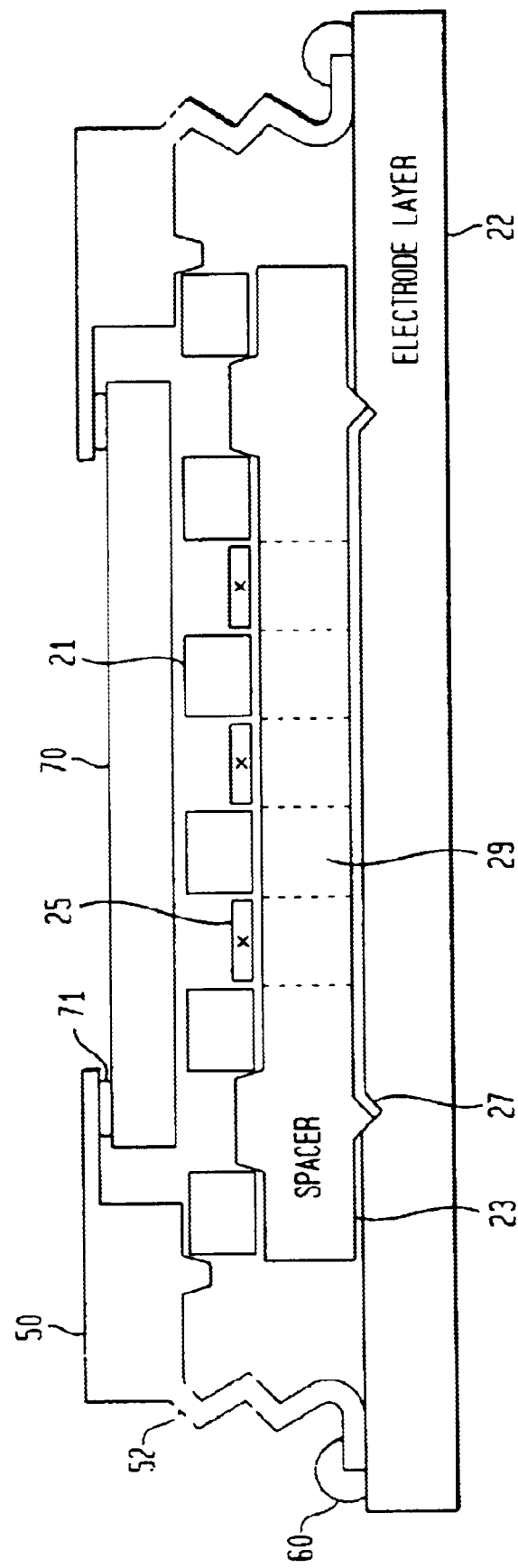
FIG. 7 shows a MEMs device including a transparent window.

FIG. 7, shows such an alternative embodiment wherein the stiffener plate 50 includes a transparent window 70 for optical communication. The window 70 can be permanently and hermetically bonded to the metal frame 50 as by glass-to-metal brazing 71 prior to the MEMS assembly. The bonded frame/window structure, in the shape of upside-down box with resilient side walls is then placed over the MEMS stack, and the side walls bonded to the electrode layer as by soldering, glass frit bonding, epoxy bonding, anodic bonding, mechanical spring assembly or riveting.

The bonding process, if carried out all the way around the periphery, produces a hermetically sealed MEMS package. The hermetically sealed MEMS devices are well protected so that they are easily diced into individual devices, e.g., from an 8" actuator wafer, without contamination or damage to the fragile MEMS structure. The optical window 70 is preferably anti-reflection coated and preferably has slightly non-parallel surfaces to avoid undesirable loss of entering light beam signals.

Figure 8:
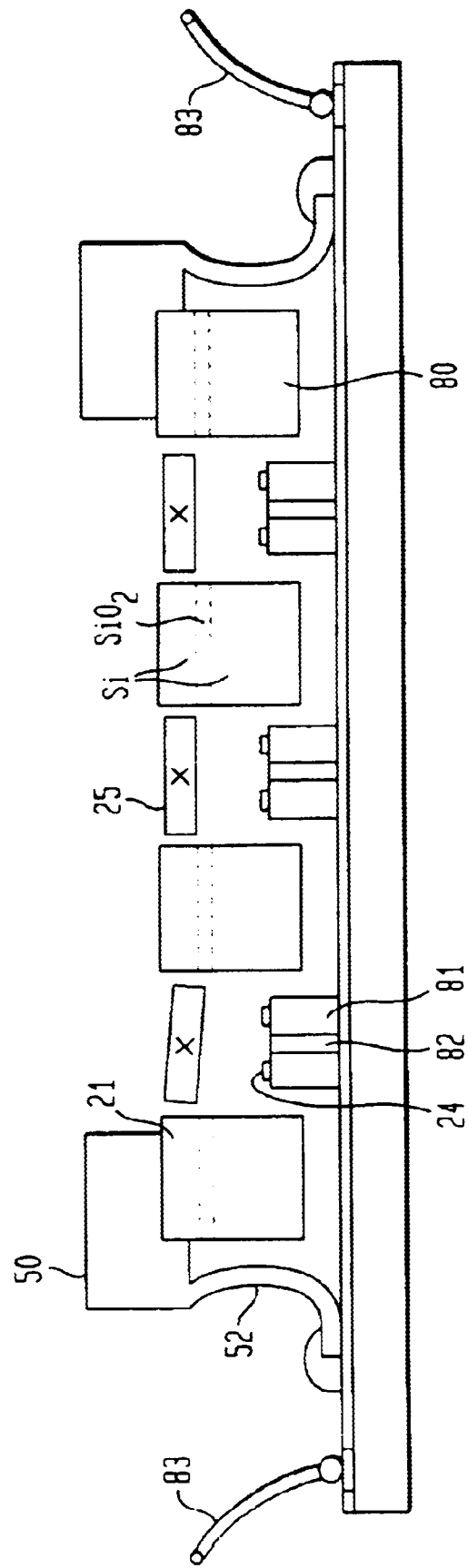
FIG. 8 illustrates a MEMs device including a pre-formed spacer.

FIG. 8 illustrates an alternative embodiment where the mirror layer 21 includes pre-formed spacers comprising thicker portions 80. This layer 21 can be readily fabricated by the SOI process. The SOI mirror layer 21 is turned upside-down so that the thicker portions 80 of the substrate form the spacer. The mirror 25 is formed on the layer of silicon distal from the actuation layer, and the layer of silicon proximal the actuation layer is configured to at least partially enclose the region underlying the mirror between the mirror and the actuation layer. Since the preferred thickness of the mirror-carrying substrate is at least 200 micrometers for mechanical sturdiness, this gap may be too large for easy, low-voltage actuation of the electrostatic operation of the MEMS mirrors. In order to overcome this complication, the actuator electrodes 24 are optionally formed on raised regions 81 (mesas), so that relatively low voltage operation is possible. Such raised areas can be achieved by deposition of polysilicon, glass, metal or composite material base by chemical vapor deposition, physical vapor deposition, or electrochemical deposition.

One way of making electrical connections to the raised electrodes 24 is to use via holes 82 in combination with mesas 81. The protruding mesa 81 can be made to fit into a spacer cavity. The vertical via holes 82 can be metallized with metallic thin film deposition, polysilicon deposition, or with conductive polymer composite fillers. The via holes are electrically connected to underlying interconnection wires (usually thin film aluminum lines) which can be connected by bonding wires 83 to the electrical circuitry and power supply (not shown).

The device of FIG. 8 is particularly useful for the following reasons: 1) the enclosing spacer walls (which are part of the mirror layer substrate) prevent or minimize the aerodynamic cross-talk of mirror operation, 2) the silicon proximal the actuation layer can be p-type or n-type doped, or coated with conducting material to reduce or eliminate electrostatic cross-talk and thereby shield the mirror, 3) the flat upper surface of the mirror avoids anomalous light reflection from corners or walls, and 4) the mirror layer and the spacer layer are easily grounded.

Alternatively, a pre-formed spacer can be formed on the actuator layer instead of the mirror layer. This can be accomplished by etching and patterning the electrode layer in such a way that a protruding spacer of desired thickness is presented on the top surface.

The inventive spring packaged optical MEMS device with accurate mirror-electrode spacing is useful as a reliable optical channel cross connect for signal rerouting or signal modification in an optical communication system. In a cross connect similar to FIG. 1(b), each mirror of a MEMs device described herein receives an optical signal from an input fiber and reflects it toward an intended output fiber.

Figure 9:
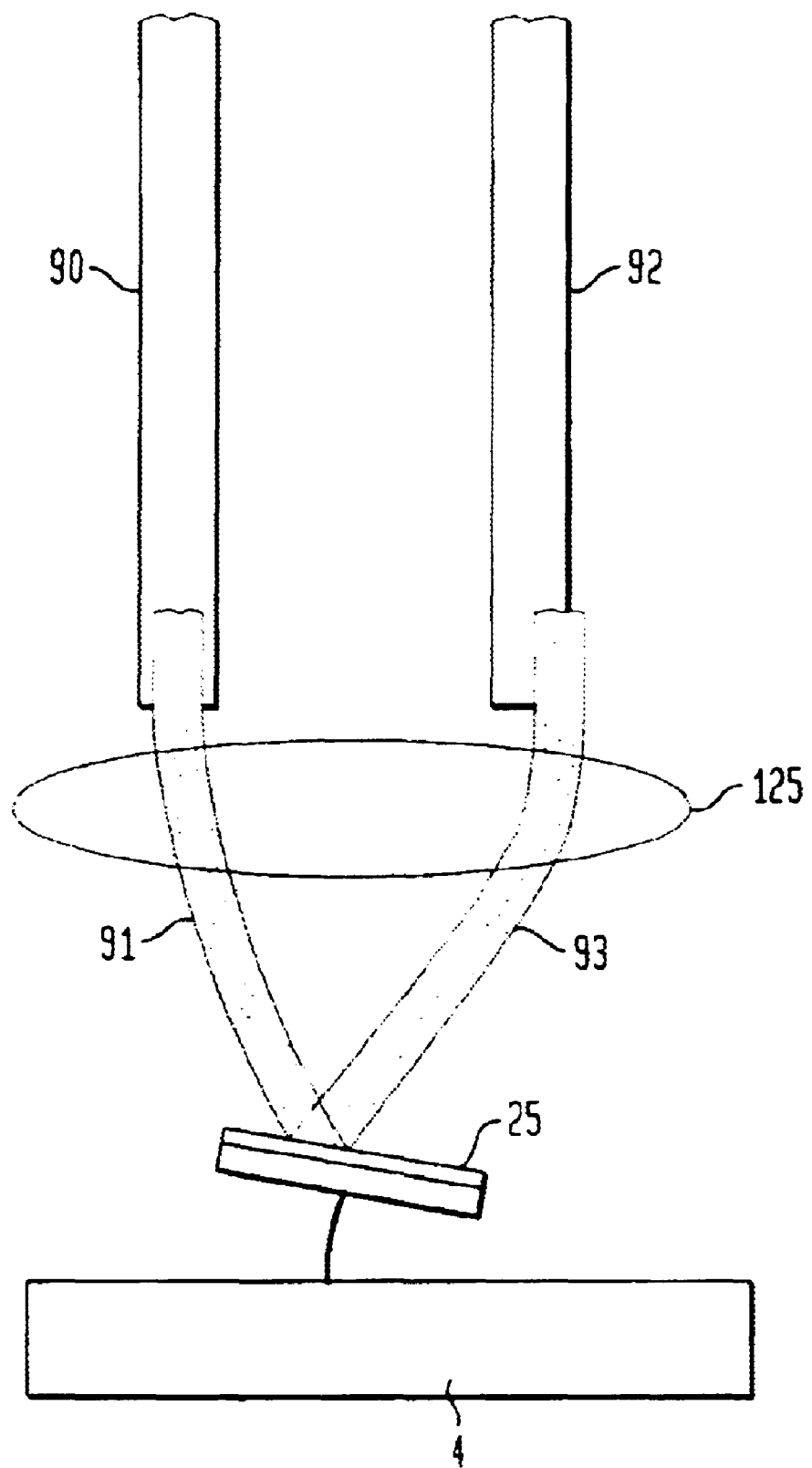
FIG. 9 schematically illustrates a variable attenuator.

The inventive device is also useful for various other light-reflecting mirror systems such as power equalizers, variable attenuators, optical add/drop and switches. FIG. 9 illustrates a variable attenuator using the common principle upon which such systems are based. Assume that an input fiber 90 transmits an input signal 91 to be attenuated and sent to output fiber 92. Then controllable mirror 25 is positioned for receiving signal 91 and is oriented for reflecting the signal so that only a portion of the reflected signal 93 enters the output fiber 92. Fine control of the mirror orientation permitted by the accurate spacing and alignment of the inventive packaged assembly permits fine control of the degree of attenuation. Thus the inventive packaged devices and arrays described hereinabove can be used as variable attenuators, optical switches, add drop switches, and power equalizers.

Figure 1A:
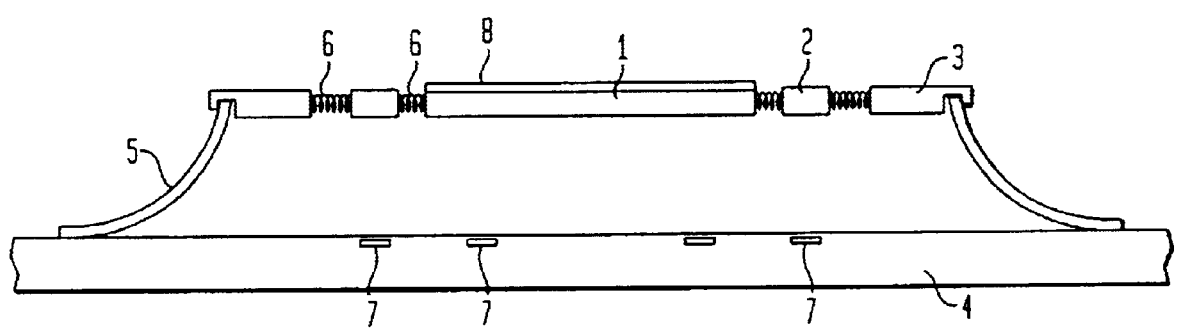
FIGS. 1(a) and 1(b) illustrate conventional MEMs devices and their application.
Figure 1B:
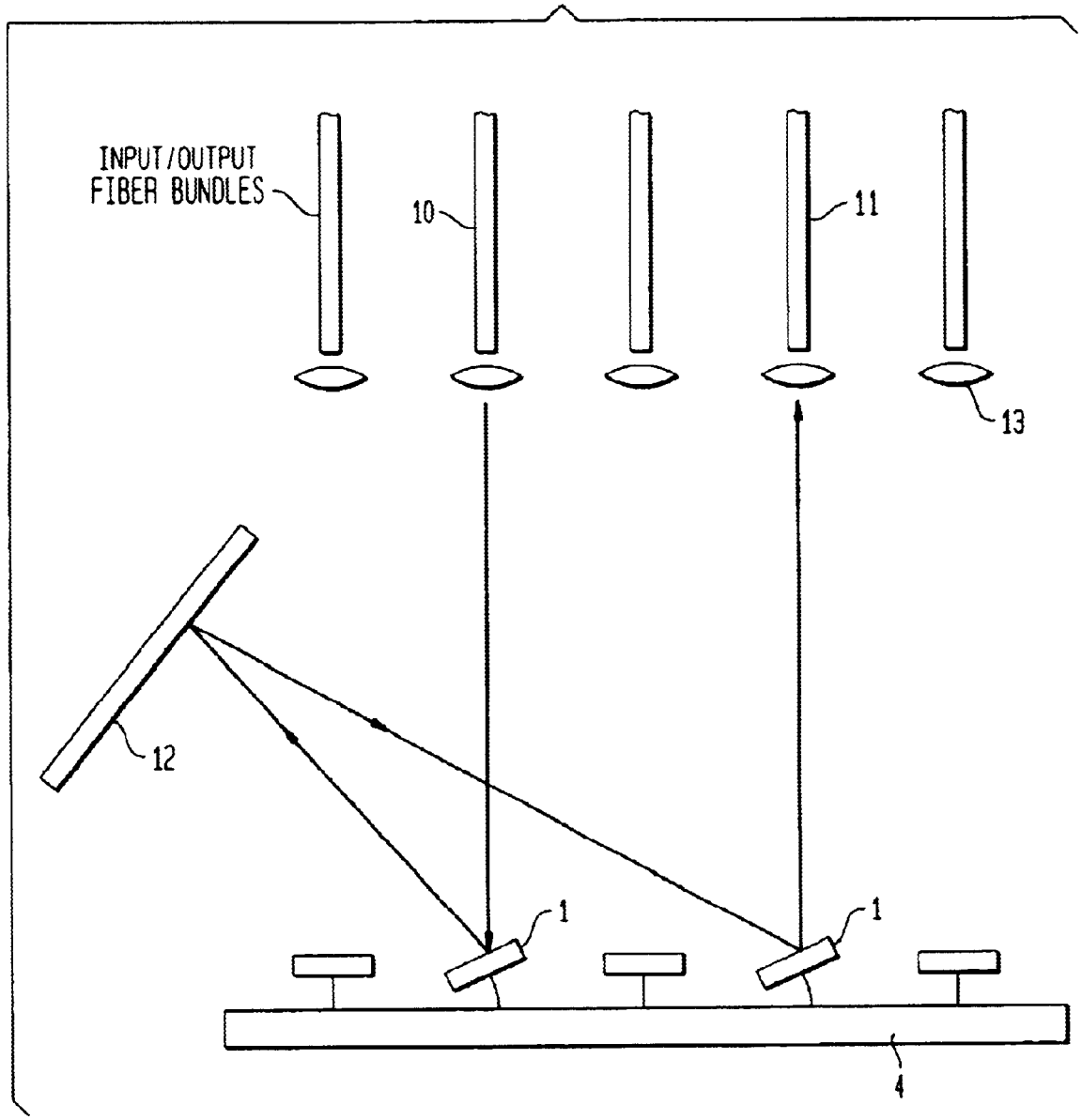

For a switch or an add/drop switch, in an arrangement similar to FIG. 1(b), the mirror for a channel to be switched off, dropped or rerouted is oriented to reflect the input signal to a different output fiber or to no output fiber, as desired. Hence the signal is rerouted, dropped or switched off. A channel is readily added to an output fiber by a mirror oriented to reflect a new input to the output.

An important application relates to power equalization in an optical fiber amplifier. By way of background, multi-wavelength optical communication systems require reconfiguration and reallocation of wavelengths among the various nodes of a network depending on user requirements, e.g., with programmable add/drop elements. One problem limiting the capacity of such systems is that the erbium-doped fiber amplifier, which is often a necessary component in optical communication systems, has a characteristic spectral dependence providing different gain for different wavelength channels. This spectral dependence poses a problem for multichannel WDM systems, because different gains for different channels lead to high bit error rates in some of the channels. As the number of channels passing through the amplifier changes by channel add/drop reconfiguration, the amplifier starts to develop deleterious peaks in its gain spectrum at some wavelength channels, requiring modification of the signal spectrum and flattening of the amplifier gain.

A novel dynamic gain equalizer is based on MEMS optical devices with convenient and reliable packaging and improved accuracy of mirror-electrode spacing. The optical signal gain in each wavelength channel can be independently (and simultaneously with other channels) controlled by the MEMS optical mirror that reflects that particular signal. The mirrors in this case do not have to be tiltable in all orientations. A simple bending of a cantilever beam structure, desirably with a light-reflecting metal surface, can serve the purpose of gain equalizing. In addition, the mirrors do not have to be in circular shape. They can be square, rectangular, or of any elongated shape. The multiplexed optical signal is demultiplexed using suitable demultiplexers such as planar waveguides or thin film devices, with each of the separated wavelength channel signal being sent to each MEMS mirror and reflected. By programmably selecting the tilt (or bend) angle of relevant mirrors slightly off the angle of maximum signal reflection, the losses for various channels can be intentionally increased to different degrees for the purpose of gain equalizing. The stability of mirror operation enhanced by the inventive packaged optical MEMS devices is important for ensuring the accuracy of dynamic gain control by different mirrors.

Figure 10:
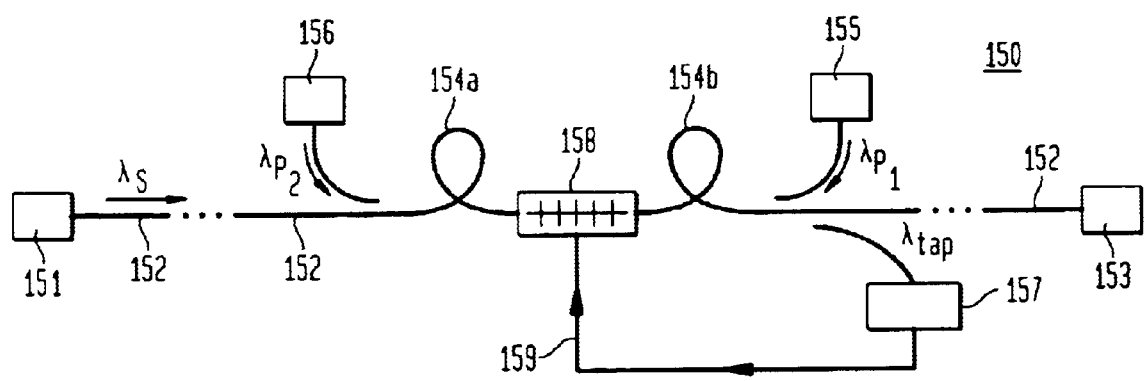
FIG. 10 schematically illustrates a dynamic gain equalizer based on a MEMs device.

FIG. 10 schematically illustrates an exemplary optical communication system comprising the packaged MEMS mirror structure as a gain equalizer. The system 150 comprises dynamically gain-equalized optical amplifiers, a reconfigurable MEMS mirror-type spectral shaping device, and a feedback device. Specifically, the system 150 comprises a transmitter source 151 of optical signals such as a digitally modulated 1.55 µm signal, an optical signal path comprising a length of optical fiber 152 for transmitting the signal, and a receiver 153 for receiving and demodulating the signal. One or more optical amplifiers, such as erbium-doped fiber amplifiers 154a, 154b, are disposed in the optical signal path for amplifying the transmitted signal. The amplifiers are pumped by pump sources 155, 156, of optical energy of pump wavelengths $\lambda_{p1}$ and $\lambda_{p2}$.

One of the preferred uses of the device of FIG. 10 is to reduce spectral dependence in the gain output of an optical amplifier. For example, the characteristic gain spectrum of an erbium-doped optical fiber amplifier has a pair of gain peaks at about 1.53 µm and at about 1.56 µm. Thus, a signal at 1.53 µm will be amplified more than one at 1.54 µm, which would be disadvantageous in a wavelength division multiplexing (WDM) system.

By properly demultiplexing the optical signal and sending to different light-reflecting mirrors for separately programmed attenuation of signal strengths, and by optional tuning of the mirror reflections via a feedback system, the gain spectrum of the amplifier device combination can be made substantially flat over a range of wavelengths. The tunable system 158 comprises a demultiplexer in combination with a tunable light-reflecting MEMS mirror device and a multiplexer to put together the different wavelength channels into the optical fiber. The device 158 is connected to a feedback system 159, having a wavelength detector 157 coupled to the fiber 152 for detecting the wavelength response $\lambda_{tap}$. The feedback system 159 automatically adjusts the tuning of the device 158 depending upon $\lambda_{tap}$. Advantageously, system 150 can be a WDM system using a plurality of different wavelength signals, e.g. $\lambda_{s1}$ and $\lambda_{s2}$ and a plurality of tunable MEMS mirror devices coupled to one or more detectors.

It is understood that the above-described embodiments are illustrative of only a few of the many possible specific embodiments that can represent applications of the invention. Numerous and varied other arrangements can be made by those skilled in the art without departing from the spirit and scope of the invention.

What is claimed is:

1. A micro-electro-mechanical (MEMS) device comprising:
   a) a component layer having a frame and at least one component movably connected to the frame;
   b) an actuator layer having at least one conductive path and at least one actuator for moving the component;
   c) at least one spacer to separate the component layer and the actuator layer by a vertical gap spacing, the spacer optionally being separate from or part of the component layer and/or the actuator layer; and
   d) at least one resilient member coupled to the component layer and the actuator layer, wherein the component layer, spacer and actuator layer are held in laterally-aligned and vertically spaced relation by resilient force from the resilient member.

2. The MEMs device of claim 1 wherein the component layer and the actuator layer have facing surfaces, each having a planar configuration.

3. The MEMs device of claim 1 wherein the component layer or the actuator layer has a mesa configuration.

4. The MEMs device of claim 1 wherein the component layer, the spacer, and the actuator layer are laterally self-aligned by alignment slots, protruding features, or stepped edges present in one or more of the layers.

5. The MEMs device of claim 1 wherein the spacer aerodynamically isolates the mirror by blocking at least 20% of the peripheral area underlying the component.

6. The MEMs device of claim 1 wherein the component is a mirror.

7. An improved optical power gain equalizer system for dynamically reducing the variation of optical signal strength comprising a MEMs device according to claim 6.

8. An improved wavelength division multiplexing telecommunication system comprising a MEMs device according to claim 6.

9. An improved light signal switch for an optical telecommunication system comprising a MEMs device according to claim 6.

10. An improved variable optical attenuator for an optical telecommunication system comprising a MEMs device according to claim 6.

11. The MEMs device of claim 1 wherein the actuator layer has a mirror image pattern of the component layer.

12. The MEMs device of claim 1 wherein the component layer comprises single crystal silicon.

13. The MEMs device of claim 1 wherein the component layer comprises polycrystalline silicon.

14. The MEMs device of claim 1 wherein the component is a mirror comprising a coating of metal.

15. The MEMs device of claim 1 wherein the spacer has a coefficient of thermal expansion (CTE) different from the component layer and the actuator layer by not more than 50%.

16. The MEMs device of 15 wherein the spacer comprises a material selected from the group consisting of Si, Mo, W, Zr, Hf, Ta, Ti, Fe—Ni alloys or Fe—Co—Ni alloys.

17. The MEMs device of claim 1 wherein the range of resilient coupling is at least 5 micrometers.

18. The MEMs device of claim 1 wherein the spacer is comprised of ferromagnetic material.

19. The MEMs device of claim 1 wherein a transparent plate is disposed overlying the component layer.

20. MEMs device of claim 19 wherein the resilient member is hermetically sealed to the actuator layer and the transparent plate to hermetically package the MEMs device.

21. The MEMs device of claim 1 wherein the spacer includes walls defining a cavity below the component and the walls are conductive to electrostatically isolate the component.

22. The MEMs device of claim 21 wherein the walls substantially cover the peripheral area around the cavity to aerodynamically isolate the cavity.

23. The MEMs device of claim 1 wherein the resilient member is coupled to the component layer or the actuator layer by bonding.

24. The MEMs device of claim 1 wherein the resilient member is coupled to the component layer or the actuator layer by solder bonding, fusion bonding, glass frit bonding or adhesive bonding.

25. The MEMs device of claim 1 wherein the resilient member is coupled to the component layer or the actuator layer by resilient compressive force.

26. The MEMs device of claim 1 further comprising a stiffening frame disposed over the component layer.

27. The MEMs device of claim 1 wherein the resilient member is hermetically sealed to the actuator layer.

28. A method of assembling a MEMS device at ambient temperature comprising the steps of:
   a) providing a component layer comprising a frame and at least one movable component movably coupled to the frame;
   b) providing an actuation layer which contains at least one actuator for moving the movable component;
   c) disposing a spacer between the component layer and the actuator layer so as to provide a predetermined vertical spacing gap between them, the spacer optionally being separate from or part of the mirror layer and/or the actuator layer; and
   d) coupling at least one resilient member to the component layer and the actuator layer to hold the component layer, the spacer and the actuator layer together by resilient force.

29. The method of claim 28 wherein the of component layer and the actuator layer each have facing surfaces in a planar configuration.

30. The method of claim 28 wherein at least one of the component layer and the actuator layer has a mesa configuration.

31. The method of claim 28 wherein the component layer comprises a plurality of components comprising movable mirrors.

32. The method of claim 31 wherein the spacer forms a cavity between at least one mirror and its actuator, the cavity having walls blocking at least 20% of the peripheral area around the cavity.

33. The method of claim 28 wherein the component layer comprises single crystal silicon.

34. The method of claim 28 wherein the component layer comprises polycrystalline silicon.

35. The method of claim 28 wherein the spacer has a coefficient of thermal expansion (CTE) different from that of the component layer and the actuator layer by not more than 50%.

36. The method of claim 35 wherein the spacer material is selected from the group consisting of Si, Mo, W, Zr, Hf, Ta, Ti, Fe—Ni alloys or Fe—Co—Ni alloys.

37. The method of claim 28 wherein the assembly is performed at ambient temperature.

* * * * *